(12) United States Patent
Gadkaree et al.

(10) Patent No.: US 8,482,900 B2
(45) Date of Patent: Jul. 9, 2013

(54) POROUS CARBON FOR ELECTROCHEMICAL DOUBLE LAYER CAPACITORS

(75) Inventors: Kishor Purushottam Gadkaree, Painted Post, NY (US); Jia Liu, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 155 days.

(21) Appl. No.: 12/956,061

(22) Filed: Nov. 30, 2010

(65) Prior Publication Data

US 2012/0134070 A1    May 31, 2012

(51) Int. Cl.
H01G 9/00 (2006.01)
C01B 31/08 (2006.01)
C01B 31/00 (2006.01)
C01B 31/02 (2006.01)
C04B 35/00 (2006.01)

(52) U.S. Cl.
USPC ......... 361/502; 502/416; 264/105; 423/445 R

(58) Field of Classification Search
USPC ......... 361/502; 502/416; 264/105; 423/445 R
See application file for complete search history.

(56) References Cited

U.S. PATENT DOCUMENTS

| | | | |
|---|---|---|---|
| 6,865,068 B1 * | 3/2005 | Murakami et al. | 361/502 |
| 7,091,156 B2 | 8/2006 | Hirahara et al. | |
| 2007/0238612 A1 | 10/2007 | Fujino et al. | |
| 2008/0180881 A1 * | 7/2008 | Feaver et al. | 361/502 |
| 2010/0150814 A1 | 6/2010 | Gadkaree et al. | |
| 2010/0151328 A1 | 6/2010 | Gadkaree et al. | |

FOREIGN PATENT DOCUMENTS

| | | |
|---|---|---|
| JP | 2002/265215 | 9/2002 |
| JP | 2004107814 | 4/2004 |
| WO | 2006/103310 | 10/2006 |
| WO | 2007/088163 | 8/2007 |

OTHER PUBLICATIONS

Pandolfo, A.G.; Hollenkamp, A.F., Carbon properties and their role in supercapacitors. Journal of Power Sources 2006, 157, 11-27.
Ahmadpour, A.; Do, D.D., The Preparation of Active Carbons From Coal by Chemical and Physcial Activation. Carbon 1996, 34, (4), 471-479.
Illan-Gomez, M.J.; Garcia-Garcia, A.; de Lecea, C.S.-M.; Linares-Solano, A., Activated Carbons from Spanish Coals. 2. Chemical Activation. Energy & Fuels 1996, 10, 1108-14.
Ahmadpour, A.; Do, D.D., The preparation of activated carbon from macadamia nutshell by chemical activation. Carbon 1997, 35, (12), 1723-1732.
Kadlec, O.; Varhanikova, A.; Zukal, A., Structure of pores of active carbons prepared by water-vapour and zinc-dichloride activation. Carbon 1970, 8, 321-331.
Treusch, O.; Hofenauer, A.; Troger, F.; Fromm, J.; Wegener, G.; Basic properties of specific wood-based materials carbonised in a nitrogen atmosphere. Wood Sci Technol 2004, 38, 323-333.

(Continued)

*Primary Examiner* — Eric Thomas
*Assistant Examiner* — Arun Ramaswamy
(74) *Attorney, Agent, or Firm* — Michael W. Russell

(57) ABSTRACT

An electrochemical double layer capacitor electrode comprising microporous carbon, wherein the microporous carbon comprises a median pore width of 1.2 nanometers or less, and a ratio of BET surface area to total pore volume greater than 2200 $m^2/cm^3$.

12 Claims, 2 Drawing Sheets

OTHER PUBLICATIONS

Cadek, M.; Oettinger, O.; Wachtler, M.; Raymundo-Pinero, E.; Beguin, F., Bio-Based Materials for Supercapacitor. In Carbon 2007, Seattle, WA 2007.

Tennison, S.R.; Phenolic-resin-derived activated carbons. Applied Catalysis A: General 1998, 173, 289-311.

Yue, Z.; Mangun, C.L.; Economy, J., Preparation of fibrous porous materials by chemical activation 1. ZnCl2 activation of polymer-coated fibers. Carbon 2002, 40, 1181-81.

Teng, H.; Wang, S-C., Preparation of porous carbons from phenol-formaldehyde resins with chemical and physical activation. Carbon 2000, 38, 817-824.

Yue, Z.; Economy, J.; Mangun, C.L., Preparation of fibrous porous materials by chemical activation 2. H3PO4 activation of polymer coated fibers. Carbon 2003, 41, 1809-17.

* cited by examiner

POROUS CARBON FOR ELECTROCHEMICAL DOUBLE LAYER CAPACITORS

FIELD OF THE DISCLOSURE

The disclosure relates generally to electrochemical double layer capacitors and more particularly to electrodes comprising activated carbon useful, for example, in EDLCs.

BACKGROUND

Energy storage devices such as ultracapacitors, also known as electrochemical double layer capacitors (EDLCs), may be used in many applications where a discrete power pulse is required. Example applications range from cell phones to hybrid vehicles. Energy storage devices typically comprise a porous separator and/or an organic electrolyte sandwiched between a pair of carbon electrodes. The energy storage is achieved by separating and storing electrical charge in the electrochemical double layer at the interfaces between the electrolyte and the electrodes. Important characteristics of these devices are the energy density and power density that they can provide, which are both largely determined by the properties of the carbon based electrodes.

Carbon-based electrodes suitable for incorporation into high energy density devices are known. The carbon materials, which form the basis of such electrodes, can be made from natural or synthetic precursor materials. Known natural precursor materials include coals, nut shells, and biomass, while synthetic precursor materials typically include phenolic resins. With both natural and synthetic precursors, carbon materials can be formed by carbonizing the precursor and then activating the resulting carbon. The activation can comprise physical (e.g., steam) or chemical activation.

A property of the carbon that can influence its success when incorporated into high energy density devices such as EDLCs is the material's specific capacitance. Higher volumetric specific capacitance generally results in a higher volumetric energy density of the resulting device. Accordingly, it would be an advantage to provide activated carbon materials having a high specific capacitance. Such materials can be used to form carbon-based electrodes that enable higher energy density devices.

SUMMARY

The performance of EDLCs comprising carbon based electrodes can be intimately related to the properties of the carbon. Disclosed herein is an improved level of understanding regarding activated carbon materials and their use in EDLCs. The carbon materials disclosed herein have a structure defined by the ratio of total BET surface area to total pore volume, independent of the type of activated carbon. In this disclosure, it is demonstrated that a ratio of total BET surface area to total pore volume of microporous carbon correlates to EDLC performance. Disclosed is a microporous carbon comprising median pore width of 1.2 nanometer or less and a ratio of total BET surface area to total pore volume from 2200 $m^2/cm^3$ to 20,000 $m^2/cm^3$.

Embodiments disclosed herein relate to an electrochemical double layer capacitor electrode comprising microporous carbon, wherein the microporous carbon comprises a median pore width of 1.2 nanometers or less, and a ratio of total BET surface area to total pore volume from 2200 $m^2/cm^3$ to 20,000 $m^2/cm^3$.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
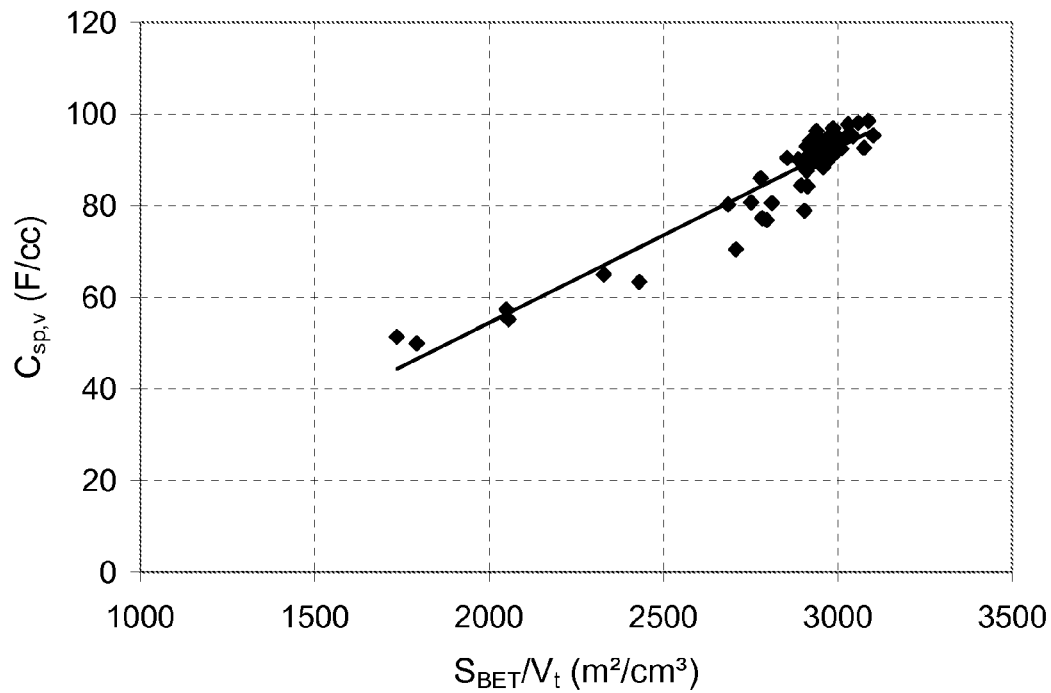
FIG. 1 is a plot showing volumetric specific capacitance as a function of the ratio of total BET surface area to total pore volume of activated carbon samples.

Embodiments disclosed herein include an electrochemical double layer capacitor electrode comprising microporous carbon, wherein the microporous carbon comprises a median pore width of 1.2 nanometers or less, and a ratio of total BET surface area to total pore volume from 2200 $m^2/cm^3$ to 20,000 $m^2/cm^3$.

In a typical EDLC, a pair of electrodes is separated by a porous separator and the electrode/separator/electrode stack is infiltrated with a liquid organic or inorganic electrolyte. Microporous activated carbon can be incorporated into one or more carbon-based layers of a composite electrode. The carbon-based layers comprise activated carbon powder that has been mixed with other additives (e.g., binders) and compacted into a thin sheet and laminated either directly or via an intermediate conductive layer onto a conductive metal current collector backing.

By way of example, a carbon-based layer having a thickness in the range of about 100-300 micrometers can be prepared by rolling and pressing a powder mixture comprising 70-95 wt % microporous activated carbon, 0-10 wt % carbon black and 5-20 wt % binder (e.g., a fluorocarbon binder such as PTFE or PVDF). Optionally, a solvent can be used to form the powder mixture into a paste that can be pressed into a carbon sheet and dried. Carbon sheets can be calendared, stamped or otherwise patterned and laminated to a conductive current collector or a current collector coated with a conductive layer to form a carbon-based composite electrode. Prior to incorporation in the composite electrode, example carbon sheets can have a length, width, and thickness of 18 inches, 3.75 inches, and 250 microns, respectively. The composite electrode can be incorporated into an energy storage device.

During use, an electrochemical double layer can form via the stored charge that accumulates on opposing electrodes. The amount of charge stored in the electrochemical double layer impacts the achievable energy density and power density of the capacitor.

Electrical properties (e.g., volumetric capacitance and gravimetric capacitance) of microporous activated carbon materials can be evaluated by measuring the characteristics of carbon-based composite films. The carbon-based composite films evaluated herein include 85 wt. % activated carbon material, 5 wt. % conductive carbon (e.g., Black Pearls®, which is marketed by Cabot Corporation, Boston, Mass.), and 10 wt. % Teflon® (PTFE). A button cell can be formed by punching carbon disks having a diameter of 0.625 inches from sheets of the composite material. A separator is placed between identical carbon disks which, in turn, are sandwiched between two conductive carbon-coated aluminum current collectors. A thermoset polymer ring is formed around the periphery of the assembly to seal the cell, which is filled with an organic electrolyte such as tetraethylammonium-tetrafluoroborate (TEA-TFB) in acetonitrile. A suitable concentration of electrolyte can range from 1 to 2.5M, e.g., 1.25, 1.5, 1.75, 2.0, 2.25 or 2.5M.

The capacitance of the cell ($C_{cell}$) is measured from galvanostatic discharge. The cell is first charged at a constant current (icharge) to a desired potential (e.g., 2.7 V), which is followed by a constant current discharge (idischarge). According to Ohm's law, capacitor current (i) is proportional to the time derivative of capacitor voltage according to:

$$i = C \frac{dV}{dt} \quad (1)$$

where C is capacitance, V is the cell voltage (in Volts) and t is time (in seconds).

By measuring the slope from the galvanostatic discharge curve (cell voltage vs. time), the cell capacitance (in Farads) can then be calculated as:

$$C_{cell} = \frac{i_{discharge}}{\frac{dV}{dt}} \quad (2)$$

The cell capacitance is the harmonic sum of two individual capacitances represented by the electrochemical double layer capacitance of each of the carbon disks (capacitors in series). This relationship can be expressed as:

$$\frac{1}{C_{cell}} = \frac{1}{C_1} + \frac{1}{C_2} \quad (3)$$

where $C_1$ and $C_2$ are the double layer capacitances of the individual carbon disks in the cell.

The magnitudes of these capacitances can be correlated to the volumetric specific capacitance of the carbon disks as:

$$C_1 = C_{sp,1} \times V_1 \quad (4)$$

$$C_2 = C_{sp,2} \times V_2 \quad (5)$$

where $C_{sp,1}$ and $C_{sp,2}$ are specific capacitances of the individual carbon disks (in F/cm³) and $V_1$ and $V_2$ are the corresponding electrode volumes. Because the test cell uses disks having identical size and composition, $C_1 = C_2$, $C_{sp,1} = C_{sp,2}$ ($= C_{sp}$) and $V_1 = V_2$ ($= V_{total}/2$, where $V_{total}$ is the total volume (cm³) of carbon electrode in the cell). Equations (3), (4) and (5) can be combined to give a volumetric capacitance, $C_{sp}$ as:

$$\frac{1}{C_{cell}} = \frac{2}{C_{sp} \times V_{total}} + \frac{2}{C_{sp} \times V_{total}} \quad (6)$$

or,

-continued $$C_{sp} = \frac{4 \times C_{cell}}{V_{total}}$$

Electrodes generally comprise porous carbon or activated carbon materials. The two electrodes can be configured identically or different from one another. Thus, the description of various characteristics of electrodes can be applied to either one or both electrodes. It should be understood that either electrode, or both electrodes can independently have any or all of the characteristics discussed herein.

In some embodiments, at least one electrode comprises activated carbon. An electrode that includes a majority (by weight) of activated carbon is referred to herein as an "activated carbon electrode." In some embodiments, an activated carbon electrode includes greater than about 50 wt % activated carbon (e.g., greater than 50, 60, 70, 80, 90, or 95 wt % activated carbon). An activated carbon electrode may include materials other than activated carbon. In some embodiments, either one or both electrodes can comprise an activated carbon electrode. For example, one electrode can include a majority of activated carbon and the other electrode can include a majority of graphite. In some embodiments, both the first electrode and the second electrode are activated carbon electrodes.

In some embodiments, the activated carbon that is utilized in an electrode can have a carbon surface area obtained by BET method of at least about 100 m²/g. In some embodiments, the BET surface area of the microporous carbon is greater than 100 m²/g, 200 m²/g, 300 m²/g, 400 m²/g, 500 m²/g, 600 m²/g, 700 m²/g, 800 m²/g, 900 m²/g, 1000 m²/g, 1100 m²/g, 1200 m²/g, 1300 m²/g, 1400 m²/g, 1500 m²/g, 1600 m²/g, 1700 m²/g, 1800 m²/g, 1900 m²/g, 2000 m²/g, 2100 m²/g, 2200 m²/g, 2300 m²/g, 2400 m²/g, 2500 m²/g, 2600 m²/g, 2700 m²/g, 2800 m²/g, 2900 m²/g, or 3000 m²/g. In some embodiments, the BET surface area of the microporous carbon is less than 3000 m²/g, 2900 m²/g, 2800 m²/g, 2700 m²/g, 2600 m²/g, 2500 m²/g, 2400 m²/g, 2300 m²/g, 2200 m²/g, 2100 m²/g, 2000 m²/g, 1900 m²/g, 1800 m²/g, 1700 m²/g, 1600 m²/g, 1500 m²/g, 1400 m²/g, 1300 m²/g, 1200 m²/g, 1100 m²/g, 1000 m²/g, 900 m²/g, 800 m²/g, 700 m²/g, 600 m²/g, 500 m²/g, 400 m²/g, 300 m²/g, or 20 m²/g. In some embodiments, the BET surface area of the microporous carbon is within a range as selected from the values listed above. For example, the BET surface area of the microporous carbon is greater than 100 m²/g and less than 3000 m²/g, greater than 400 m²/g and less than 2900 m²/g, greater than 2000 m²/g and less than 3000 m²/g, or greater than 2000 m²/g and less than 2800 m²/g.

Specific examples of activated carbon that may be utilized include coconut shell-based activated carbon, petroleum coke-based activated carbon, pitch-based activated carbon, polyvinylidene chloride-based activated carbon, polyacene-based activated carbon, phenolic resin-based activated carbon, polyacrylonitrile-based activated carbon, and activated carbon from natural sources such as coal, charcoal or other natural organic sources.

Electrodes can include one or more binders. Binders can function to provide mechanical stability to an electrode by promoting cohesion in loosely assembled particulate materials. Binders can include polymers, co-polymers, or similar high molecular weight substances capable of binding the activated carbon (and other optional components) together to form porous structures. Specific exemplary binders include polytetrafluoroethylene (PTFE), polyvinylidene fluoride, or other fluoropolymer particles; thermoplastic resins such as polypropylene, polyethylene, or others; rubber-based binders such as styrene-butadiene rubber (SBR); and combinations thereof. In some embodiments, PTFE can be utilized as a binder. In further embodiments, fibrillated PTFE can be utilized as a binder.

An electrode can also include one or more conductivity promoters. A conductivity promoter functions to increase the overall conductivity of the electrode. Exemplary conductivity promoters include carbon black, natural graphite, artificial graphite, graphitic carbon, carbon nanotubes or nanowires, metal fibers or nanowires, graphenes, and combinations thereof. In some embodiments, carbon black can be used as a conductivity promoter. In some embodiments, an electrode can include up to about 10 wt % of a conductivity promoter. For example, an electrode can include from about 1 wt % to about 10 wt % of conductivity promoter (e.g., 1, 2, 4, or 10 wt %).

In some embodiments, the total pore volume of the microporous carbon is in the range of from 0.2 cm$^3$/g to 1.5 cm$^3$/g, for example, from 0.4 cm$^3$/g to 1.0 cm$^3$/g. The total pore volume may be measured using nitrogen adsorption and calculated using Density Functional Theory (DFT) assuming split pores.

In some embodiments, the activated carbon electrode comprises pores having a size of $\leq 1$ nm, which provide a combined pore volume of $\geq 0.3$ cm$^3$/g; pores having a size of from >1 nm to $\leq 2$ nm, which provide a combined pore volume of $\geq 0.05$ cm$^3$/g; and <0.15 cm$^3$/g combined pore volume of any pores having a size of >2 nm.

In some embodiments, the microporous carbon has a median pore width of 1.0 nanometers or less, for example 0.9 nanometers or less, or 0.8 nanometers or less. The median pore width is calculated from the DFT pore size distribution data, weighed by pore volume.

Disclosed herein is an electrochemical double layer capacitor electrode comprising microporous carbon, wherein the microporous carbon comprises a median pore width of 1.2 nanometers or less, and wherein the ratio of BET surface area to pore volume is from a minimum value to a maximum value. In some embodiments, the minimum ratio of BET surface area to pore volume is 2200 m$^2$/cm$^3$, 2300 m$^2$/cm$^3$, 2400 m$^2$/cm$^3$, 2500 m$^2$/cm$^3$, 2600 m$^2$/cm$^3$, 2700 m$^2$/cm$^3$, 2800 m$^2$/cm$^3$, 2900 m$^2$/cm$^3$, 3000 m$^2$/cm$^3$, 3500 $^2$/cm$^3$, 4000 m$^2$/cm$^3$, 5000 m$^2$/cm$^3$, or 6000 m$^2$/cm$^3$. In some embodiments, the maximum ratio of BET surface area to pore volume is 20,000 m$^2$/cm$^3$, 10,000 m$^2$/cm$^3$, 6000 m$^2$/cm$^3$, 5000 m$^2$/cm$^3$, 4000 m$^2$/cm$^3$, 3500 m$^2$/cm$^3$, 3400 m$^2$/cm$^3$, 3300 m$^2$/cm$^3$, 3200 m$^2$/cm$^3$, 3100 m$^2$/cm$^3$, 3000 m$^2$/cm$^3$, 2900 m$^2$/cm$^3$, 2800 m$^2$/cm$^3$, 2700 m$^2$/cm$^3$, 2600 m$^2$/cm$^3$, 2500 m$^2$/cm$^3$, 2400 m$^2$/cm$^3$, or 2300 m$^2$/cm$^3$. In some embodiments, the ratio of BET surface area to pore volume is within a range selected from a minimum and maximum value, for example, from 2200 m$^2$/cm$^3$ to 3500 m$^2$/cm$^3$, from 2300 m$^2$/cm$^3$ to 3500 m$^2$/cm$^3$, from 2400 m$^2$/cm$^3$ to 3500 m$^2$/cm$^3$, from 2500 m$^2$/cm$^3$ to 3500 m$^2$/cm$^3$, from 2600 m$^2$/cm$^3$ to 3500 m$^2$/cm$^3$, from 2700 m$^2$/cm$^3$ to 3500 m$^2$/cm$^3$, from 2800 m$^2$/cm$^3$ to 3500 m$^2$/cm$^3$, from 2900 m$^2$/cm$^3$ to 3500 m$^2$/cm$^3$, or from 3000 m$^2$/cm$^3$ to 3500 m$^2$/cm$^3$, from 2200 m$^2$/cm$^3$ to 20,000 m$^2$/cm$^3$, from 2200 m$^2$/cm$^3$ to 10,000 m$^2$/cm$^3$, from 2200 m$^2$/cm$^3$ to 5000 m$^2$/cm$^3$, from 2300 m$^2$/cm$^3$ to 20,000 m$^2$/cm$^3$, from 2300 m$^2$/cm$^3$ to 10,000 m$^2$/cm$^3$, from 2300 m$^2$/cm$^3$ to 5000 m$^2$/cm$^3$, from 2400 m$^2$/cm$^3$ to 5000 m$^2$/cm$^3$, or from 2900 m$^2$/cm$^3$ to 5000 m$^2$/cm$^3$ In some embodiments the electrochemical double layer capacitor electrode has a volumetric specific capacitance greater than 70 F/cc, greater than 80 F/cc, greater than 90 F/cc or greater then 100 F/cc.

EXAMPLES

Figure 2:
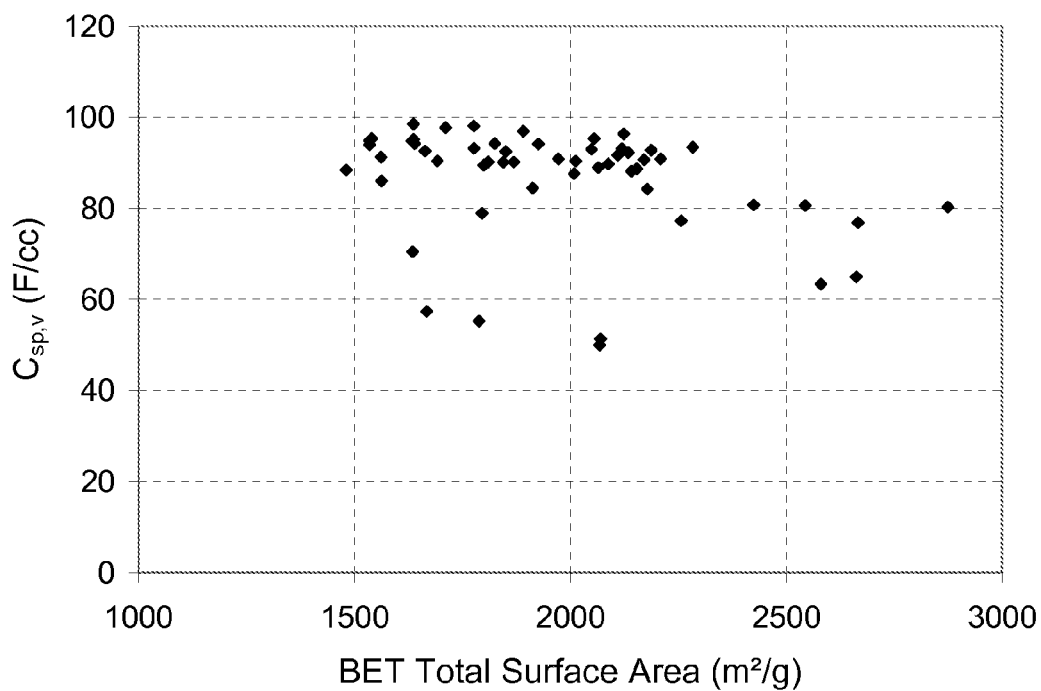
FIG. 2 is a plot of volumetric specific capacitance as a function of total BET surface area of activated carbon samples.
Figure 3:
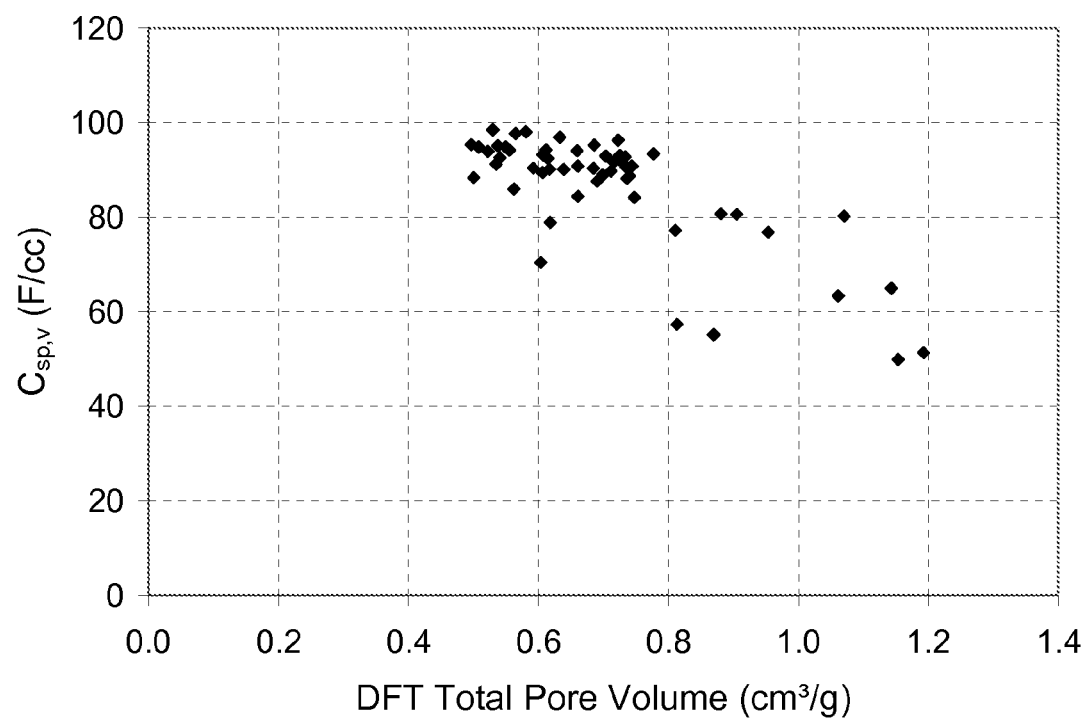
FIG. 3 is a plot showing volumetric specific capacitance as a function of DFT total pore volume of activated carbon samples.

FIGS. 1, 2 and 3 show data from 55 activated carbons synthesized under various conditions. Performance of these activated carbons in EDLCs was evaluated in button cells, which were made by blending the activated carbon, carbon black (Black Pearl 2000, as conductive additive) and PTFE (as binder) in the proportion of 85:5:10 by weight and rolling the mixture into electrodes. 1.5 M tetraethylammonium tetrafluoroborate solution in acetonitrile was used as electrolyte. These activated carbon samples were measured using nitrogen adsorption on a Micromeritics ASAP 2420 and total surface area and total pore volume were calculated using the Density Functional Theory (DFT) assuming slit pores. Total surface area was also measured using BET method.

FIGS. 2 and 3 show the volumetric specific capacitance ($C_{sp,v}$) versus the total BET surface area ($S_{BET}$) and versus the DFT total pore volume ($V_t$), respectively. FIG. 2 shows the capacitance varies from about 60 to 100 F/cc with a total BET surface area range of from 1500 to 2900 m$^2$/g. FIG. 3 shows the capacitance varies from about 60 to 100 F/cc with a DFT total pore volume range of from 0.5 to 1.2 cm$^3$/g. FIG. 1 shows $C_{sp,v}$ against the $S_{BET}/V_t$ ratio. As the $S_{BET}/V_t$ ratio increases the volumetric specific capacitance increases almost linearly. As the ratio increases above 2200 m$^2$/cm$^3$ the capacitance becomes useful and above 2500 m$^2$/cm$^3$ high capacitance values are obtained.

Example 1

An activated carbon was derived from a wheat flour precursor by KOH activation. This activated carbon had a total BET surface area of 2068 m$^2$/g, a total pore volume of 1.15 cm$^3$/g, and a $S_{BET}/V_t$ ratio of 1216 m$^2$/cm$^3$. The volumetric specific capacitance of the activated carbon was measured to be 49.9 F/cc.

Example 2

An activated carbon was derived from a wheat flour precursor by KOH activation using different process conditions from Example 1. This activated carbon had a total BET surface area of 1636 m$^2$/g, a total pore volume of 0.53 cm$^3$/g, and a $S_{BET}/V_t$ ratio of 3087 m$^2$/cm$^3$. The volumetric specific capacitance of the activated carbon was measured to be 98.5 F/cc. Comparing Example 2 to Example 1, the total surface is similar, but the total pore volume is about half; as a result, the $S_{BET}/V_t$ ratio is about twice, to which the twice as high volumetric specific capacitance is attributable.

Example 3

An activated carbon was derived from a cornmeal precursor by KOH activation. This activated carbon had a total BET surface area of 1535 m$^2$/g, a total pore volume of 0.52 cm$^3$/g, and a $S_{BET}/V_t$ ratio of 2936 m$^2$/cm$^3$. The volumetric specific capacitance of the activated carbon was measured to be 93.9 F/cc.

Example 4

An activated carbon was derived from a coconut shell precursor by KOH activation. This activated carbon had a total BET surface area of 1633 m$^2$/g, a total pore volume of 0.55 cm$^3$/g, and a $S_{BET}/V_t$ ratio of 2971 m$^2$/cm$^3$. The volumetric specific capacitance was measured to be 94.8 F/cc.

Example 5

An activated carbon was derived from a phenolic resin precursor by KOH activation. This activated carbon had a total surface area of 1850 m$^2$/g, a total pore volume of 0.61 cm$^3$/g, and a $S_{BET}/V_t$ ratio of 3010 m$^2$/cm$^3$. The volumetric specific capacitance was measured to be 92.5 F/cc.

The data for these examples, including median pore width is summarized in Table 1.

TABLE 1

| Example | BET Total Surface Area $S_{BET}$ (m²/g) | DFT Total Surface Area $S_t$ (m²/g) | DFT Total Pore Volume $V_t$ (cm³/g) | $S_t/V_t$ (m²/cm³) | $S_{BET}/V_t$ (m²/cm³) | DFT Median Pore Width (Å) | $C_{sp,v}$ (F/cc) |
|---|---|---|---|---|---|---|---|
| Example 1 | 2068 | 1403 | 1.15 | 1216 | 1792 | 23.48 | 49.9 |
| Example 2 | 1636 | 1321 | 0.53 | 2492 | 3087 | 7.23 | 98.5 |
| Example 3 | 1535 | 1196 | 0.52 | 2289 | 2936 | 7.86 | 93.9 |
| Example 4 | 1633 | 1302 | 0.55 | 2370 | 2971 | 7.51 | 94.8 |
| Example 5 | 1850 | 1337 | 0.61 | 2176 | 3010 | 7.59 | 92.5 |

As the data shows, Example 1 has the largest median pore width of 23.48 Å and the lowest volumetric specific capacitance at 49.9 F/cc. Examples 2-5 have median pore widths in the range of 7-8 Å and volumetric specific capacitance greater than 90 F/cc.

It has been demonstrated that median pore width and the ratio of BET surface area to total pore volume may be useful parameters for choosing carbons for EDLC applications.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. An electrochemical double layer capacitor electrode comprising microporous carbon, wherein the microporous carbon comprises:
    a median pore width of 1.2 nanometers or less;
    a ratio of BET surface area to total pore volume greater than 2400 m²/cm³;
    pores having a size of ≦1 nm, which provide a combined pore volume of ≧0.3 cm³/g;
    pores having a size of from >1 nm to ≦2 nm, which provide a combined pore volume of ≧0.05 cm³/g; and
    <0.15 cm³/g combined pore volume of any pores having a size of >2 nm.

2. An electrochemical double layer capacitor electrode of claim 1, wherein the ratio of BET surface area to total pore volume is from 2400 m²/cm³ to 20,000 m²/cm³.

3. An electrochemical double layer capacitor electrode of claim 1, wherein the ratio of BET surface area to pore volume is from 2400 m²/cm³ to 3500 m²/cm³.

4. An electrochemical double layer capacitor electrode of claim 1, wherein the BET surface area of the microporous carbon is greater than 1000 m²/g.

5. An electrochemical double layer capacitor electrode of claim 1, wherein the BET surface area of the microporous carbon is greater than 2100 m²/g.

6. An electrochemical double layer capacitor electrode of claim 1, wherein the total pore volume is from 0.2 to 1.5 cm³/g.

7. An electrochemical double layer capacitor electrode of claim 1, wherein the total pore volume is from 0.4 to 1.0 cm³/g.

8. An electrochemical double layer capacitor electrode of claim 1, wherein the median pore width is 1.0 nanometers or less.

9. An electrochemical double layer capacitor electrode of claim 1, wherein the median pore width is 0.8 nanometers or less.

10. An electrochemical double layer capacitor electrode of claim 1, having a volumetric specific capacitance greater than 90 F/cc.

11. An electrochemical double layer capacitor electrode of claim 1, having a volumetric specific capacitance greater than 80 F/cc.

12. An electrochemical double layer capacitor electrode of claim 1, wherein the microporous carbon is incorporated into a sheet having a thickness of about 100-300 microns.

* * * * *